United States Patent
Scieszinski et al.

[11] 3,953,889
[45] Apr. 27, 1976

[54] ELECTRONIC HEAD ADJUST SYSTEM FOR REMOVABLE MAGNETIC DISCS

[75] Inventors: James L. Scieszinski, Simi Valley; Ericsen M. Dunstan, Calabasas; Sidney T. Schell, Chatsworth, all of Calif.

[73] Assignee: Pertec Corporation, Chatsworth, Calif.

[22] Filed: Oct. 24, 1974

[21] Appl. No.: 517,543

[52] U.S. Cl. .................................. 360/77; 360/78; 360/98; 360/105
[51] Int. Cl.² ...................... G11B 5/54; G11B 5/58
[58] Field of Search ............... 360/77, 78, 75, 98, 360/97, 104–109

[56] References Cited
UNITED STATES PATENTS

| | | |
|---|---|---|
| 3,733,592 | 5/1973 | Applequist et al. ................... 360/78 |
| 3,737,883 | 6/1973 | Sordello et al. ...................... 360/78 |
| 3,753,254 | 8/1973 | Ruble et al. ......................... 360/77 |
| 3,787,644 | 1/1974 | Schneider .......................... 360/109 |
| 3,789,378 | 1/1974 | Bonzano ............................ 360/77 |
| R25,719 | 1/1965 | Johnson et al. ...................... 360/77 |

*Primary Examiner*—Alfred H. Eddleman
*Attorney, Agent, or Firm*—Lindenberg, Freilich, Wasserman, Rosen & Fernandez

[57] ABSTRACT

Means for making field alignment of transducers with reference tracks prerecorded on a master disc comprising a source of regulated voltage, a separate potentiometer associated with each selected transducer, a separate switch coupling each potentiometer to a summing junction of a positioner servo-control circuit common to all transducers, and means responsive to transducer selecting signals for turning on the coupling switch of the associated potentiometer.

4 Claims, 4 Drawing Figures

Fig. 1. (FUNCTIONAL BLOCK DIAGRAM)

ELECTRONIC HEAD ADJUST SYSTEM FOR REMOVABLE MAGNETIC DISCS

BACKGROUND OF THE INVENTION

This invention relates to a system for positioning a transducer on a selected track of a record disc file, and more particularly to improvements which allow more accurate alignment of the transducer with the selected track.

In those types of data storage systems employing rotating discs, such as a magnetic disc file, the discs are rotated at a constant speed and the transducers, capable of either reading or writing, are flown over the disc surfaces on an air film. Addressing stored data is accomplished by means of selecting a transducer, specifying the track position for the transducer, and specifying the segment or sector of the track to be accessed. The transducer positioner is controlled in both the velocity and position modes by a servo-control circuit. There is usually one transducer for each surface of each disc, but all are positioned in unison by the positioner. Once properly positioned to the addressed track, data transfer to or from the track is effected upon selecting the transducer associated with the specific disc surface bearing the track to be accessed.

In the past, it has been common to provide a track density of 100 tracks per inch (TPI) on magnetic disc surfaces using conventional heads for the transducers to either read or write. In systems employing removable discs, the limit on track density has not been the effective recording or reading width of the head but rather the accuracy with which the heads can be aligned with respect to a fixed track in space since a disc might be recorded in one disc memory drive unit and then placed on another for reading, or in another position of the same unit, in the case of a unit having more than one removable disc. If all units are not aligned with respect to a fixed track in space, the positioner could misalign the head to a position between tracks or even on an adjacent track. Other record storage systems employing a rotating disc would suffer the same limitation, such as a storage system employing magneto-optic techniques.

A widely used technique for aligning heads in a magnetic disc file is to place a master disc on the drive unit with a reference track prerecorded with a high degree of precision at the same track address on both sides of the disc. The operator then aligns the heads on both sides of the disc with the reference tracks. Thereafter, upon addressing any track on any disc placed on the unit, the right track will be accessed with a high degree of reliability even though tracks thereon may have been recorded on another unit, so long as the other unit has been aligned using the same master disc, or another master disc having its reference tracks recorded with the same precision. This is so because the positioner servo-control circuit will respond to the track addresses numbered consecutively from 000 for the outer track to position the head through one unit of space for each unit in the number of the track address. Consequently alignment of one head with respect to a reference track on a master disc guarantees alignment of the head for all tracks. That is inherent in a position servo-control circuit.

Recording reference tracks on master discs with sufficient precision is feasible with appropriate laboratory apparatus. Once a master disc has been properly prepared, it can be used repeatedly to align heads as disc memory drive units are installed in the field, thus justifying the expense of preparing a master disc.

While master discs have been widely used for alignment of heads in disc files having a track density of 100 TPI, such master discs have not heretofore been used for alignment of heads in systems having a greater track density, not because the master discs cannot be produced with higher precision, but because it is too difficult for the persons who make the field alignment to adjust the heads to a reference track with the higher degree of precision required for a density greater than 100 TPI. Usually the operator must make a head alignment by adjustment of assorted mechanical techniques, such as set screws on opposed cam surfaces that cause the arm or lever which carries the transducer to slide along a predetermined path. In a typical instance, two offset screws are employed. One offset screw must be turned counterclockwise to slide the transducer arm in one direction while the other is turned clockwise. The extent of movement achieved depends upon a delicate balance between how much one offset screw is turned counterclockwise while the other is turned clockwise.

SUMMARY OF THE INVENTION

In accordance with the present invention, a disc file having a track density greater than 100 TPI, and having a servomechanism for positioning transducers to addressed track positions, is provided with separate means for fine position adjustment of selected transducers associated with at least one removable disc, each with respect to a reference track at a preselected track address on a master disc comprising: a unique source of an offset signal selectively coupled to a summing means for addition to a connective position error signal in the position servomechanism; a separate means for each transducer for adjusting the unique offset signal for fine adjustment of the position of an associated transducer after a course adjustment has been made using mechanical techniques; and means for coupling a separate offset signal associated with each transducer in response to signals for selecting the transducers associated with the removable disc, one at a time, whereby the position servomechanism receives a different offset signal for each transducer associated with the removable disc.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
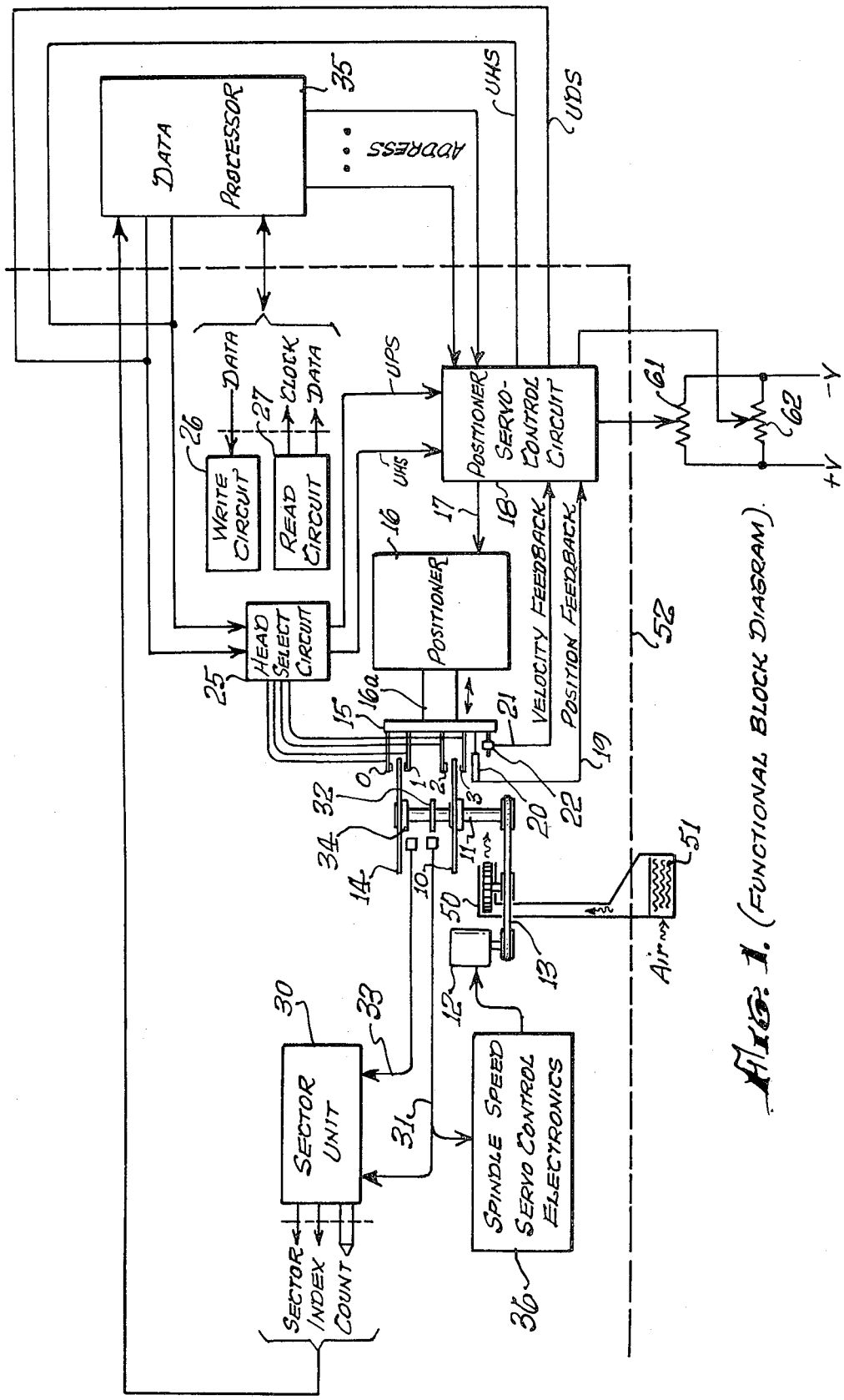
FIG. 1 schematically illustrates a disc file with one fixed and one removeable disc, and a transducer positioning system employing the present invention common to both discs.

Referring to FIG. 1, a magnetic disc file is shown having a permanently mounted disc 10 on a spindle 11 driven by a motor 12 through a belt 13, and having a removable upper disc 14. A transducer carriage 15 positions read/write heads on both sides of both discs in unison through operation of a positioner 16 which responds to a controlled signal on a line 17 from a control circuit 18 receiving a position feedback signal over a line 19 from a photoelectric position transducer 20, and velocity feedback over a line 21 from a velocity transducer 22, such as a magnet moved by the carriage within a specially wound coil.

The heads are numbered 0, 1, 2 and 3, as shown, and are addressed through a head select circuit 25 for writing through a circuit 26, and for reading through a circuit 27. The data are stored on the upper and lower discs in tracks which are numbered from 000, the outer track through 406, the inner track spaced approximately 2 inches from the outer track for a track density of 200 TPI. As just noted, the positioner 16 is driven by the positioner servo-control circuit to position all the read/write heads in unison to any one of the tracks. Consequently, for addressing purposes, the tracks on both discs having the same address may be viewed as being on a concentric cylinder cutting through both discs, although in practice each disc may have its tracks offset from the cylinder. This type of disc memory drive, which utilizes a single head per recording surface, is referred to as a "moving-head disc drive" in which stored data is addressed by specifying (1) the desired head position through the positioner servo-control circuit 18, (2) the head to be used and (3) the track segment or sector to be operated on.

The sector information is generated by a unit 30 which responds to sector pulses on a line 31 derived from a slotted disc 32 rotated by the shaft 11 in unison with the discs, and to sector pulses on a line 33 derived from a slotted disc 34 rotated in unison with the slotted disc 32. The sector information is transmitted to a data processor 35 which transmits data to the write circuit 26 at the appropriate time as determined from the sector data and which receives data and data clock pulses from the read circuit 27. The data processor also provides head select signals to the circuit 25 and the track address to the positioner servo-control circuit 18. The pulses from the slotted disc 32 applied to the sector unit 30 are also applied to spindle speed servo-control electronics 36 as feedback for speed control to within 1%. The sector unit 30 effectively counts down pulses from the slotted disc to divide each revolution into a desired whole number of evenly time-spaced sectors beginning with an index position indicated by an index pulse on the line 33. The sector unit also includes a counter which counts the evenly time-spaced sectors starting with the first following the index position to provide sector information to the data processor 35.

To summarize the environment for the present invention described thus far, as the record discs rotate at a constant speed, the recording heads are flown over the disc surfaces by the positioner 16 which is controlled in both velocity and position to move the carriage 15 to a track specified by the data processor through the positioner servo-control circuit 18. Data pulses are then recorded on the desired surfaces by selecting the corresponding head through the head select network 25, but only in sectors selected by the data processor 35. During retrieval of the recorded data, the corresponding head is again selected and the signal obtained from the selected head is processed by the read circuit 27 into separate "data" and "clock" signals continually transmitted to the data processor which then selects data from the desired sectors, as determined by sector pulse and sector count signals from the sector unit 30.

The positioner 16 is comprised of a large and stationary permanent magnet and a "voice" coil wound on a cylinder 16a connecting the carriage 15 to the positioner 16. The cylinder thus moves the carriage in response to the control signal applied to the coil over the line 17 while the permanent magnet is held stationary on a base plate 37 shown in FIG. 2. This arrangement of magnet and coil provide a linear motor actuator for positioning the transducer.

Figure 2:
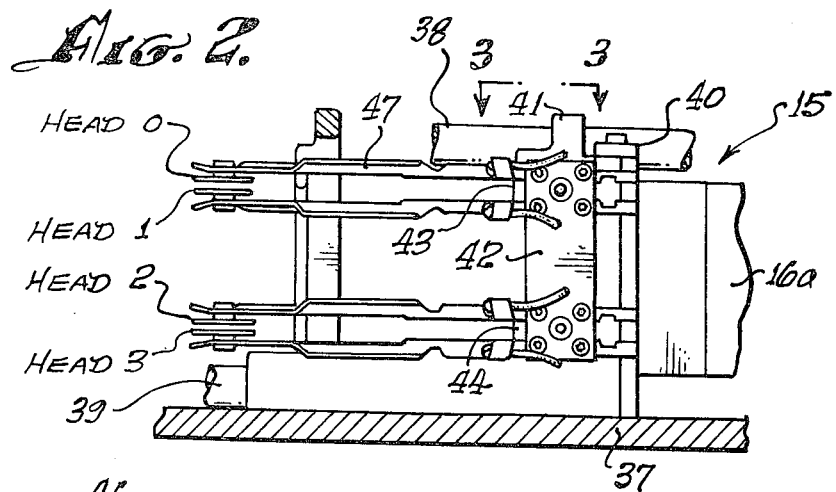
FIG. 2 is a side elevation of a positioner carriage for transducers in the disc file of FIG. 1.
Figure 3:
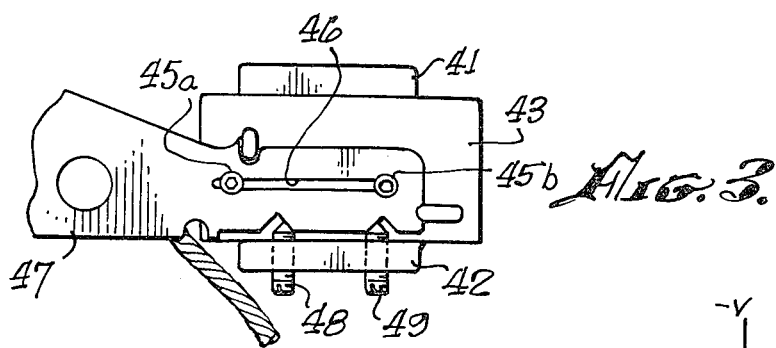
FIG. 3 is a plan view of a section 3—3 of FIG. 2 illustrating the manner in which the upper transducer positioning is adjusted along a radius of the upper removable disc of FIG. 1 using set screws.

Referring to FIG. 2, the carriage 15 is mounted on rails 38 and 39 using a plurality of wheels spaced about each rail, such as a wheel 40. The cylinder 16a, which extends to the rear of the carriage 15, is thus cantilevered on the carriage to move freely in space between poles of the permanent magnet (not shown). The carriage consists of a frame which moves on the rails in a vertical position. Connected to one vertical support member 41 at the rear of the frame is a clamping plate 42 spaced from the support member 41 by horizontal plates 43 and 44. Each of the horizontal plates, such as the upper plate 43, carries two arms, one arm for each read/write head. The arms are mounted on opposite sides of the plate 43 by screws in slots, such as screws 45a and 45b in a slot 46 of upper arm 47 attached to the horizontal plate 43 as shown in the plan view of FIG. 3 taken along the line 3—3 of FIG. 2. The arm 47 is thus cantilevered out to the left from the horizontal plate 43.

The exact position of the arm on the horizontal plate is adjusted along the line between the two screws 45a and 45b by set screws 48 and 49, each of which has a conical tip working into a V-slot on the side of the arm. Tightening one screw tends to move the arm in one direction while tightening the other screw tends to move the arm in the opposite direction. Since the two set screws work against each other, any position to which the arm is adjusted by the set screws is stable, but the precise position to which the arm should be adjusted becomes very difficult to achieve. To move the head in one direction, it is necessary to loosen one screw and tighten the other, but loosening the one screw too much will cause the arm to be moved in that one direction too far. It is then necessary to reverse the procedure by loosening the screw just tightened and tightening the screw previously loosened.

This trial and error technique can be used satisfactorily to adjust the transducers carried by the upper disc arms to a reference track on the upper disc 14, but only to a tolerance adequate for addressing tracks on a disc having a density of about 100 TPI. For a disc having a higher density of abut 200 TPI, the exact adjustment necessary is virtually impossible to achieve through the set screws because as the trial and error procedure is carried out, the operator making the adjustment will begin to fatigue to the point where he begins to err back and forth from one side to the other by approximately the same amount. Moreover, even if, after great effort, a transducer is properly adjusted, the adjustment will likely be found to be off, once the disc drive system is closed for normal operation. This is because the temperature of the components in the carriage will change as temperature rises during closed use, and since the adjustment made is purely mechanical, any change in the temperature of the components will effect a change in the position of the transducer by an amount sufficient to exceed the tolerance that must be maintained for addressing a disc having a track density significantly greater than 100 TPI. Moreover, since the upper disc is interchangeable with previously recorded discs, it is important for the transducers of the upper disc to be adjusted to a high degree of accuracy, particularly when upper discs are to be interchanged with discs recorded on other disc drives. Other disc drives must of course, be adjusted to the same degree of accuracy. The error in adjustment due to mechanical interaction between screws is more than can be tolerated for discs recorded with 200 tracks per inch.

The reference track just referred to is a predetermined track, such as track No. 073, recorded on both sides of a master disc. The master disc is placed in the position of the upper disc 14 for initial adjustment of the upper disc transducers. Each of the two transducers is then adjusted to read the recorded reference track with an optimum output signal. Once adjusted, the master disc can be replaced by any disc on which data has been recorded using the same or any other disc memory drive system having its transducers for the removable disc adjusted to the reference track position.

This initial adjustment must be made in the field after the disc memory drive system has been installed at the location of the data processor. Otherwise any movement while handling the disc memory drive may be sufficient to alter the adjustment made by an amount exceeding the tolerance required for the higher density tracks.

The transducers of lower permanent disc 10 may be adjusted prior to shipment to any predetermined position. On site adjustment for those transducers is not necessary for the reason that data will then be stored in whatever track positions the transducers are moved to in response to addressing signals, and retrieval of data is assured so long as the disc memory drive is not thereafter moved to alter the adjustment of the lower disc transducers. In other words, for the transducers of the lower disc, it is sufficient for both set screws to be screwed in equally tight to hold the arms securely in one position. Any adjustment required on site for those transducers would be simply to tighten the set screws.

For adjusting the positions of the arms for the transducers of the upper disc to the tolerance for a track density of 200 TPI, the master disc (prerecorded on both sides with a reference track to that tolerance) is placed in the upper disc position, and the positioner 16 is driven to the position of the prerecorded reference track through the positioner servo-control circuit 18. Then once the set screws have been used to position the arms for the best possible output signal from the read circuit 27, the disc memory drive system is closed for normal operation. Cooling air is circulated through the system by a fan 50 driven by the motor 12 as shown in FIG. 1. The air is drawn in through an air filter 51 and exhausted through ports in the enclosure represented by dotted line 52.

Once the system has been closed and operated for a sufficient time to reach a stable operating temperature, final adjustment of the upper-disc transducers to the reference tracks on the master disc is made by adjustment of potentiometers 61 and 62. Each introduces into the servo-control circuit 18 a DC offset that will drive the positioner 16 to the optimum position for each of the upper and lower transducers as selected. The procedure is to address the reference track, select the transducers one at a time through the head select circuit 25 and adjust the associated potentiometer. Once adjusted, the proper offset is introduced for every track each time the same transducer is selected. To accomplish that, the offset introduced for each transducer through its associated potentiometer is gated into the servo-control circuit for the positioner by the head selection signals.

The manner in which the fine adjustment is introduced as offset signals to the positioner servo-control circuit will be described with reference to FIG. 4. But first the procedure for adjusting the set screws will be more fully described.

Figure 4:
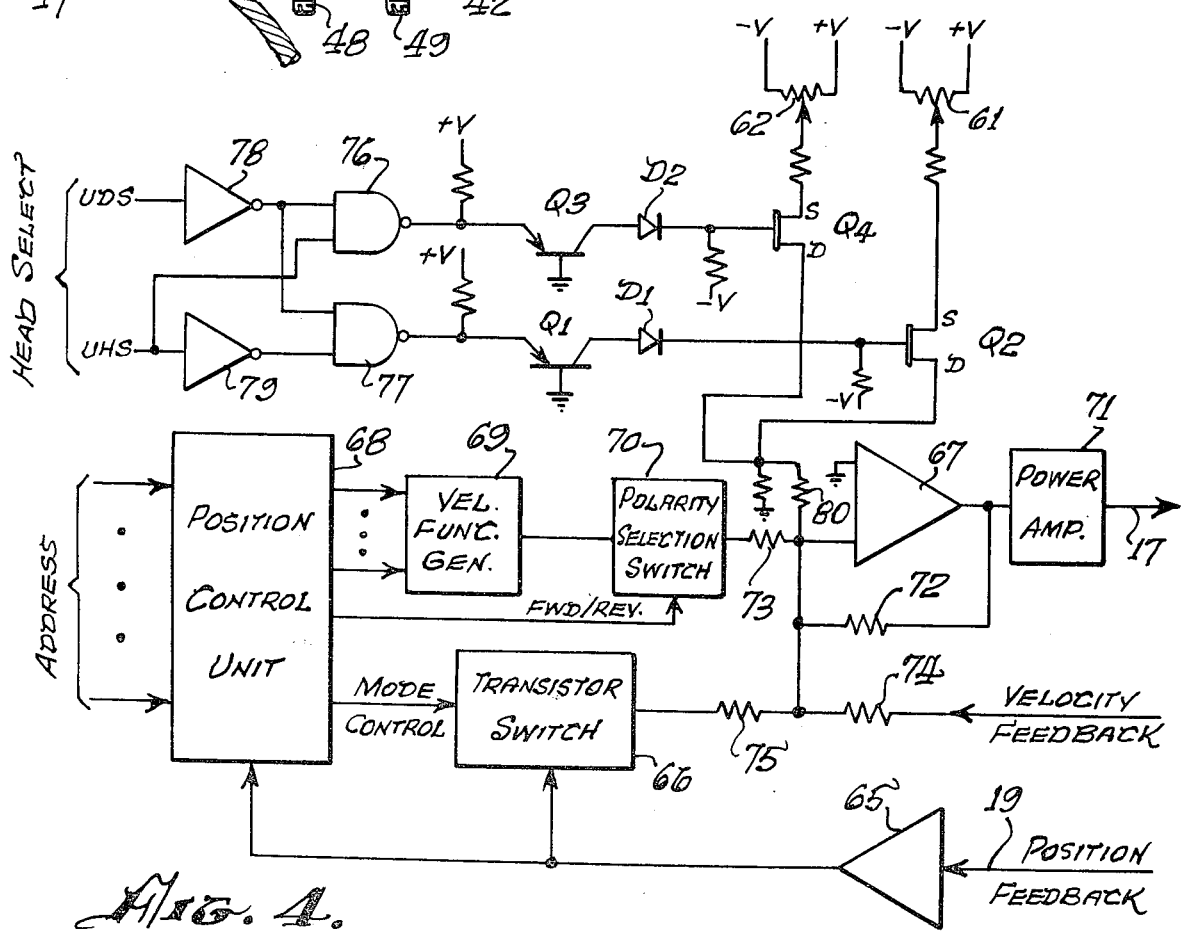
FIG. 4 is a schematic diagram of the present invention incorporated in the positioner control circuit for the transducer carriage of FIG. 2.

The servo-control circuit 18 shown in FIG. 4 includes an isolation amplifier 65 coupling the position feedback signal on the line 19 to a transistor switch 66 which couples the position feedback signal to a summing amplifier 67. The feedback signal from the position transducer 20 is sinusoidal while the transducer is being driven from a retracted position as the transducer crosses over other unrecorded track positions on the master disc. The cycles of the feedback signal are effectively counted by a position control unit 68 and the count is compared with an input address. The difference in address is applied to a velocity function generator 69 which produces a maximum error signal to the summing amplifier until the transducer approaches the addressed reference track. Then the error signal is reduced to a null as the transducer reaches a position approximately over the track.

A polarity selection switch 70 is controlled by the position control unit 68 to provide the proper polarity for forward drive. During normal operation a reverse drive causes the switch 70 to invert the polarity of the error signal.

During the search mode the transistor switch 66 is turned off. A power amplifier 71 drives the positioner 16 via the line 17. A feedback resistor 72 and a coupling resistor 73 cooperate with a resistor 74 to permit velocity feedback to be added to the error signal.

The foregoing arrangement for the search mode is exemplary of conventional systems. Once a null has been reached in the error output to the velocity function generator, the position control unit switches the transistor switch 66 on to provide a position feedback signal to the summing junction of the amplifier 67 over a resistor 75. The velocity feedback signal is at that time virtually zero. The position feedback signal will then drive the positioner 16 to a null position, which places the transducer very nearly over the center of the addressed reference track.

When the position feedback signal is at a null, and the transducer comes to rest, the read circuit 27 will produce an output signal from the recorded reference track. The set screws for the transducer arm are then adjusted to provide an optimum output signal from the reference track. The procedure is repeated for the transducer on the other side of the master disc. The disc drive unit can then be closed as for normal operation, but with the master disc still in place.

Once a normal operating temperature is reached, fine adjustment of the two upper disc transducers can be made through potentiometers 61 and 62, one at a time. To accomplish that, the upper disc select signal UDS enables NAND gates 76 and 77 through an inverter 78. If the upper head select signal UHS is true, only the NAND gate 77 is enabled through an inverter 79. The output of the NAND gate 77 is coupled by a transistor $Q_1$ (connected in a common-base configuration) and a diode $D_1$ to the gate of a field-effect transistor $Q_2$ to turn it on. The source electrode (S) of the field-effect transistor is connected to the potentiometer 61 which may then be adjusted to introduce an offset for fine adjustment in the position of the upper head on the upper disc while the address to the position control unit 68 is retained at the address of the reference track on the master disc. The offset signal thus produced is added through a resistor 80 to the amplifier 67. The potentiometer 61 is then adjusted to optimize the signal output from the read circuit. Once that has been accomplished, the head select signal, UHS, is changed to the false (0) level to enable only the NAND gate 76. A transistor $Q_3$ and diode $D_2$ couple the output of the NAND gate 76 fo a field-effect transistor $Q_4$ which is then turned on to couple the output of the potentiometer 62 to the amplifier 70 through resistor 80. The potentiometer 62 is then adjusted to optimize the signal output from the read circuit. The master disc can thereafter be replaced with a data storage disc. Any track addressed on any data storage disc placed in the upper disc position will be addressed with the same fine adjustment offset in order for all tracks of all storage discs to bear the same relative position with respect to the reference track of the master disc.

Since the lower disc is never removed, any data stored in a track can be reliably accessed so long as the positions of the transducers set by adjusting their set screws are not changed. Consequently, if the permanent lower disc is being addressed, neither of the NAND gates 76 and 77 will be enabled so that neither of the transistors $Q_2$ and $Q_4$ will be turned on. Under those conditions, no offset signal will be applied to the amplifier 67.

As noted hereinbefore, the upper disc is replaced from time to time as data is recorded, and the recorded discs are stored for later use. This technique for fine adjustment of the upper and lower read heads for the upper disc to the position of a reference track on a master disc permits interchangeability of discs with other disc memory drives. The primary advantages of this technique are high sensitivity, low backlash, and remote operation as compared to the alignment capabilities of set screws. Of particular importance is the advantage of remote operation. The potentiometers are mounted in a position readily accessible with a screw driver from the outside of the enclosure after the enclosure is closed for normal operation of the disc memory drive. That eliminates any errors associated with the different temperature environment and mechanical mounting variations encountered while making the preliminary alignment through the set screws.

Although a particular embodiment of the invention has been described and illustrated herein, it is recognized that modifications and variations may readily occur to those skilled in the art. It is therefore intended that the claims be interpreted to cover such modifications and variations.

The embodiments of the invention in which an exclusive property or privilege is claimed are defined as follows:

1. In an enclosed disc file having a drive unit for discs with concentric addressable data tracks, at least one of said discs being removable, a servomechanism for positioning said transducers to a preselected track in response to address signals and a corrective position error signal, and mechanical means for adjusting the position of each transducer associated with said removable disc over a reference track on a master disc at a preselected track address said enclosed disc file having an enclosure which may be opened for mechanically adjusting the position of each transducer, the improvement comprising:
   a separate offset signal source for each of said transducers associated with said removable disc,
   summing means for adding a signal to said corrective position error signal,
   means for selectively coupling a signal from one of said offset signal sources to said summing means for addition to said corrective position error signal, and
   means for individually adjusting each offset signal source for fine position adjustment of an associated transducer while said associated transducer is being positioned to said reference track on said master disc by said servomechanism with said enclosure closed, said adjusting means for each of said offset signal sources being positioned for adjustment from outside said enclosure.

2. Apparatus as defined in claim 1 wherein said magnetic disc drive unit includes means for selecting one of said transducers for a read or write operation in response to select signals, and wherein said means for selectively coupling each offset signal source to said summing means includes means for selectively gating an offset signal from an appropriate one of said sources to said summing means in response to said transducer select signals.

3. In a magnetic disc drive unit housed in an enclosure and having at least one removable disc and a pair of transducers associated therewith, one on each side, and having a servomechanism responsive to address signals and a corrective position error signal for positioning said pair of transducers on addressable record tracks, and further having mechanical apparatus for aligning each of said pair of transducers on reference tracks prerecorded on a master disc placed in the position of said removable disc, one reference track at a predetermined address on each side of said master disc, said mechanical apparatus comprising means for individually adjusting alignment of each of said pair of transducers over a reference track on said master disc while the head being aligned is selected by select signals for reading the reference track on its side of the disc and said servomechanism maintains said pair of transducers at said predetermined address in response to said addressing signals, all while said enclosure is open, the improvement comprising
   a pair of offset signal sources, one source for each of said pair of transducers,
   means for adding an offset signal to said corrective position signal,
   means responsive to said transducer select signals for selectively coupling an offset signal from one of said sources while selecting one of said pair of transducers and from the other of said sources while selecting the other one of said pair of transducers, and means for individually adjusting said offset signal sources from outside said enclosure while it is closed for positioning each of said pair of transducers separately while each is selected for reading by said select signals.

4. Apparatus as defined in claim 3 wherein said last named means for adjusting said offset signal sources individually is comprised of a separate potentiometer for each offset signal source.

* * * * *